US008736680B1

(12) United States Patent
Cilia et al.

(10) Patent No.: US 8,736,680 B1
(45) Date of Patent: May 27, 2014

(54) METHOD AND SYSTEM FOR SPLIT-SCREEN VIDEO DISPLAY

(75) Inventors: Andrew Cilia, McKinney, TX (US); Robert V. Vanman, McKinney, TX (US)

(73) Assignee: Enforcement Video, LLC, Allen, TX (US)

( * ) Notice: Subject to any disclaimer, the term of this patent is extended or adjusted under 35 U.S.C. 154(b) by 219 days.

(21) Appl. No.: 13/109,557

(22) Filed: May 17, 2011

Related U.S. Application Data (60) Provisional application No. 61/345,663, filed on May 18, 2010.

(51) Int. Cl.
  H04N 7/18 (2006.01)
  H04N 13/02 (2006.01)
  H04N 5/262 (2006.01)
  H04N 5/345 (2011.01)

(52) U.S. Cl.
  CPC .......... *H04N 13/0242* (2013.01); *H04N 5/2624* (2013.01); *H04N 5/3454* (2013.01)
  USPC ....................................................... 348/148

(58) Field of Classification Search
  USPC ................................ 348/148, 207.1; 345/629
  See application file for complete search history.

(56) References Cited

U.S. PATENT DOCUMENTS

| 4,389,706 | A  | 6/1983  | Gomola et al. |
| 4,949,186 | A  | 8/1990  | Peterson |
| 5,651,075 | A  | 7/1997  | Frazier et al. |
| 5,677,979 | A  | 10/1997 | Squicciarini et al. |
| 5,703,604 | A  | 12/1997 | McCutchen |
| 5,809,161 | A  | 9/1998  | Auty et al. |
| 5,844,599 | A  | 12/1998 | Hildin |
| 5,898,866 | A  | 4/1999  | Atkins et al. |
| 6,215,519 | B1 | 4/2001  | Nayar et al. |
| 6,252,989 | B1 | 6/2001  | Geisler et al. |
| 6,282,462 | B1 | 8/2001  | Hopkins |
| 6,335,789 | B1 | 1/2002  | Kikuchi |
| 6,345,219 | B1 | 2/2002  | Klemens |
| 6,373,962 | B1 | 4/2002  | Kanade et al. |
| 6,389,340 | B1 | 5/2002  | Rayner |
| 6,445,824 | B2 | 9/2002  | Hieda |
| 6,456,321 | B1 | 9/2002  | Ito et al. |
| 6,704,281 | B1 | 3/2004  | Hourunranta et al. |
| 6,707,489 | B1 | 3/2004  | Maeng et al. |
| 6,734,911 | B1 | 5/2004  | Lyons |

(Continued)

OTHER PUBLICATIONS

Cilia, Andrew, "U.S. Appl. No. 13/489,615", filed Jun. 6, 2012.

(Continued)

*Primary Examiner* — Jay Patel
*Assistant Examiner* — Neil Mikeska
(74) *Attorney, Agent, or Firm* — Winstead PC (57) ABSTRACT

A system includes a first camera operable to capture omnidirectional images and send omnidirectional-image data representing the omnidirectional images, a second camera operable to capture narrow-view images and send narrow-view-image data representing the narrow-view images, a video processor coupled to the first camera and the second camera and operable to form combined-image data using at least part of the omnidirectional-image data and the narrow-view-image data, and a display module interoperably coupled to the video processor and operable to display combined images from the combined-image data. The combined images each comprise a narrow-view-display portion and an omnidirectional-display portion.

19 Claims, 11 Drawing Sheets

(56) References Cited

U.S. PATENT DOCUMENTS

| | | |
|---|---|---|
| 6,801,574 B2 | 10/2004 | Takeuchi et al. |
| 6,831,556 B1 | 12/2004 | Boykin |
| 7,023,913 B1 | 4/2006 | Monroe |
| 7,119,832 B2 | 10/2006 | Blanco et al. |
| 7,215,876 B2 | 5/2007 | Okada et al. |
| 7,262,790 B2 | 8/2007 | Bakewell |
| 7,272,179 B2 | 9/2007 | Siemens et al. |
| 7,373,395 B2 | 5/2008 | Brailean et al. |
| 7,405,834 B1 | 7/2008 | Marron et al. |
| 7,495,579 B2 | 2/2009 | Sirota et al. |
| 7,574,131 B2 | 8/2009 | Chang et al. |
| 7,583,290 B2 | 9/2009 | Enright et al. |
| 7,711,150 B2 | 5/2010 | Simon |
| 7,768,548 B2 | 8/2010 | Silvernail et al. |
| 7,894,632 B2 | 2/2011 | Park et al. |
| 7,929,010 B2 | 4/2011 | Narasimhan |
| 8,022,874 B2 | 9/2011 | Frieaizen |
| 2002/0040475 A1 | 4/2002 | Yap et al. |
| 2002/0064314 A1 | 5/2002 | Comaniciu et al. |
| 2002/0140924 A1 | 10/2002 | Wangler et al. |
| 2002/0141618 A1 | 10/2002 | Ciolli et al. |
| 2002/0141650 A1 | 10/2002 | Keeney et al. |
| 2002/0149476 A1 | 10/2002 | Ogura |
| 2002/0180759 A1* | 12/2002 | Park et al. .............. 345/629 |
| 2003/0025599 A1 | 2/2003 | Monroe |
| 2003/0025812 A1 | 2/2003 | Slatter |
| 2003/0071891 A1 | 4/2003 | Geng |
| 2003/0112133 A1 | 6/2003 | Webb et al. |
| 2003/0172123 A1 | 9/2003 | Polan et al. |
| 2003/0214585 A1 | 11/2003 | Bakewell |
| 2004/0056779 A1 | 3/2004 | Rast |
| 2004/0080615 A1 | 4/2004 | Klein et al. |
| 2004/0119869 A1 | 6/2004 | Tretter et al. |
| 2004/0150717 A1 | 8/2004 | Page et al. |
| 2004/0218099 A1 | 11/2004 | Washington |
| 2004/0221311 A1 | 11/2004 | Dow et al. |
| 2004/0223058 A1 | 11/2004 | Richter et al. |
| 2004/0252193 A1 | 12/2004 | Higgins |
| 2004/0258149 A1 | 12/2004 | Robinson et al. |
| 2005/0090961 A1 | 4/2005 | Bonk et al. |
| 2005/0196140 A1 | 9/2005 | Moteki |
| 2005/0206773 A1 | 9/2005 | Kim et al. |
| 2006/0028547 A1 | 2/2006 | Chang |
| 2006/0033813 A1 | 2/2006 | Provinsal et al. |
| 2006/0098843 A1 | 5/2006 | Chew |
| 2006/0152636 A1 | 7/2006 | Matsukawa et al. |
| 2006/0158968 A1 | 7/2006 | Vanman et al. |
| 2006/0159325 A1 | 7/2006 | Zeineh et al. |
| 2006/0187305 A1 | 8/2006 | Trivedi et al. |
| 2006/0193384 A1 | 8/2006 | Boyce |
| 2006/0244826 A1 | 11/2006 | Chew |
| 2007/0024706 A1 | 2/2007 | Brannon et al. |
| 2007/0029825 A1 | 2/2007 | Franklin et al. |
| 2007/0109411 A1* | 5/2007 | Jung et al. .............. 348/207.1 |
| 2007/0200933 A1 | 8/2007 | Watanabe et al. |
| 2007/0217761 A1 | 9/2007 | Chen et al. |
| 2007/0222678 A1 | 9/2007 | Ishio et al. |
| 2007/0222859 A1 | 9/2007 | Chang et al. |
| 2007/0296817 A1 | 12/2007 | Ebrahimi et al. |
| 2008/0007438 A1 | 1/2008 | Segall et al. |
| 2009/0046157 A1 | 2/2009 | Cilia et al. |
| 2009/0049491 A1 | 2/2009 | Karonen et al. |
| 2009/0102950 A1 | 4/2009 | Ahiska |
| 2009/0129672 A1 | 5/2009 | Camp, Jr. et al. |
| 2009/0207248 A1 | 8/2009 | Cilia et al. |
| 2009/0213218 A1 | 8/2009 | Cilia et al. |
| 2009/0251530 A1 | 10/2009 | Cilia |
| 2011/0157376 A1 | 6/2011 | Lyu et al. |
| 2011/0234749 A1 | 9/2011 | Alon |

OTHER PUBLICATIONS

U.S. Appl. No. 12/694,931, Cilia
U.S. Appl. No. 12/779,492, Vanman.
U.S. Appl. No. 12/779,564, Vanman.
U.S. Appl. No. 12/780,050, Vanman.
U.S. Appl. No. 12/780,092, Vanman.
U.S. Appl. No. 12/362,302, Andrew Cilia et al.
U.S. Appl. No. 13/095,107, Cilia.
Copenheaver, Blaine R., International Search Report for PCT/US2009/000930 as mailed Apr. 9, 2009, (4 pages).
Young, Lee W., International Search Report for PCT/US2009/000934 as mailed Apr. 29, 2009, (3 pages).
Copenheaver, Blaine R., International Search Report for PCT/US2010030861 as mailed Jun. 21, 2010, (4 pages).
Nhon, Diep T., International Search Report for PCT/US05/36701 as mailed Oct. 25, 2006, 5 pages.
Copenheaver, Blaine R., International Search Report for PCT/US2009/032462 as mailed Mar. 10, 2009 (3 pages).
Kortum, P. et al., "Implementation of a foveated image coding system for image bandwidth reduction", SPIE Proceedings, vol. 2657, 1996, pp. 350-360, XP-002636638.
Geisler, Wilson S. et al., "A real-time foveated multiresolution system for low-bandwidth video communication", Proceedings of the SPIE—The International Society for Optical Engineering SPIE-INT. Soc. Opt. Eng. USA, vol. 3299, 1998, pp. 294-305, XP-002636639.

* cited by examiner

METHOD AND SYSTEM FOR SPLIT-SCREEN VIDEO DISPLAY

CROSS-REFERENCE TO RELATED APPLICATIONS

This patent application claims priority from and incorporates by reference U.S. Provisional Patent Application No. 61/345,663, filed May 18, 2010, entitled METHOD AND SYSTEM FOR SPLIT-SCREEN VIDEO DISPLAY. In addition, this patent application incorporates by reference, U.S. patent application Ser. No. 12/362,381 filed Jan. 29, 2009, entitled OMNIDIRECTIONAL CAMERA FOR USE IN POLICE CAR EVENT RECORDING and U.S. patent application Ser. No. 12/188,273 filed Aug. 8, 2008, entitled COMBINED WIDE-ANGLE/ZOOM CAMERA FOR LICENSE-PLATE IDENTIFICATION.

BACKGROUND

1. Field of the Invention

In general, this patent application relates to video-recording devices and more particularly, but not by way of limitation, to systems that include split-screen video displays for use with law-enforcement vehicles.

2. History of the Related Art

Cameras and other video-recording devices have long been used to capture still images and video. In general, cameras include an enclosed hollow portion with an opening or aperture at one end to allow light to enter and a recording surface for capturing the light at another end. In addition, cameras often have a lens positioned in front of the aperture along an optical axis to gather incoming light and focus all or part of an image onto the recording surface.

Use of dashboard cameras in police vehicles has been known for years and is an integral part of a police department's evidence-gathering capability. One limitation of conventional cameras is a limited field of vision. Fields of view vary from camera to camera but, in general, most cameras have a field of view that ranges from a few degrees to, at most, 180°.

To overcome the limited field of view, surveillance cameras used for monitoring large areas are oftentimes mounted to mechanisms adapted to enable the camera to pan, tilt, and zoom in order to move objects into the camera's field of view. One type of camera, called an omnidirectional camera, has been used to monitor large areas without a need for mechanisms to enable pan, tilt, and zoom.

Some omnidirectional cameras may be adapted to capture images from all directions (i.e., a full sphere). However, many omnidirectional cameras do not capture a full sphere of images, but rather capture 360 degrees of images along a single axis with the field of view being limited angularly above and below the axis. As referred to herein, an omnidirectional camera is a camera adapted to capture omnidirectional images. The omnidirectional camera is adapted to capture wide-angle images from a wide-angle field of view up to and including 360-degree images from a 360-degree field of view. An omnidirectional image may be a wide-angle image, for example, of 130-190° from a wide-angle field of view, for example, of 130-360°. In some cases, the omnidirectional camera may have a field of view ranging from on the order of 180°, 190°, 200°, 210°, 220°, 230°, 240°, 250°, 260°, 270°, 280°, 290°, 300°, 310°, 320°, 330°, 340°, 350°, or 360° and the omnidirectional images may be less than or equal to a omnidirectional-camera field of view.

More recently, dual-lens devices have been developed that combine a narrow-view lens and an omnidirectional lens. These dual-lens devices typically allow recording of up to 360 degrees of images at a plurality of different resolutions. However, display of the output from such dual-lens devices in a way that eliminates unimportant portions of images remains problematic.

SUMMARY OF THE INVENTION

A system includes a first camera operable to capture omnidirectional images and send omnidirectional-image data representing the omnidirectional images, a second camera operable to capture narrow-view images and send narrow-view-image data representing the narrow-view images, a video processor coupled to the first camera and the second camera and operable to form combined-image data using at least part of the omnidirectional-image data and the narrow-view-image data, and a display module interoperably coupled to the video processor and operable to display combined images from the combined-image data. The combined images each comprise a narrow-view-display portion and an omnidirectional-display portion.

A method includes concurrently capturing omnidirectional images and narrow-view images, storing data representing the captured omnidirectional images as omnidirectional-image data, storing data representing the captured narrow-view images as narrow-view-image data, removing data representing an unimportant portion of the narrow-view images to create cropped narrow-view-image data, creating combined-image data using the cropped narrow-view-image data and at least part of the omnidirectional-image data, and displaying combined images from the combined-image data.

A system includes an omnidirectional sensor operable to capture images and create therefrom image data, a video processor operable to create, from at least part of the image data, combined-image data includes narrow-view-image data and non-narrow-view-image data, and a display module interoperably coupled to the video processor and operable, using the combined-image data, to display combined images includes narrow-view images and non-narrow-view images. The displayed narrow-view images comprise an enlarged version of a portion of images represented by the image data.

A method includes capturing omnidirectional images, enlarging a relevant area of the omnidirectional images via a video processor, the enlarging resulting in enlarged relevant-area images, downsampling and cropping the omnidirectional images via the video processor, the downsampling resulting in downsampled cropped omnidirectional images, combining the enlarged-relevant-area images and the downsampled cropped omnidirectional images into combined images via the video processor, and displaying the combined images via a display module.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and will fully convey the scope of the invention to those skilled in the art.

Figure 1:
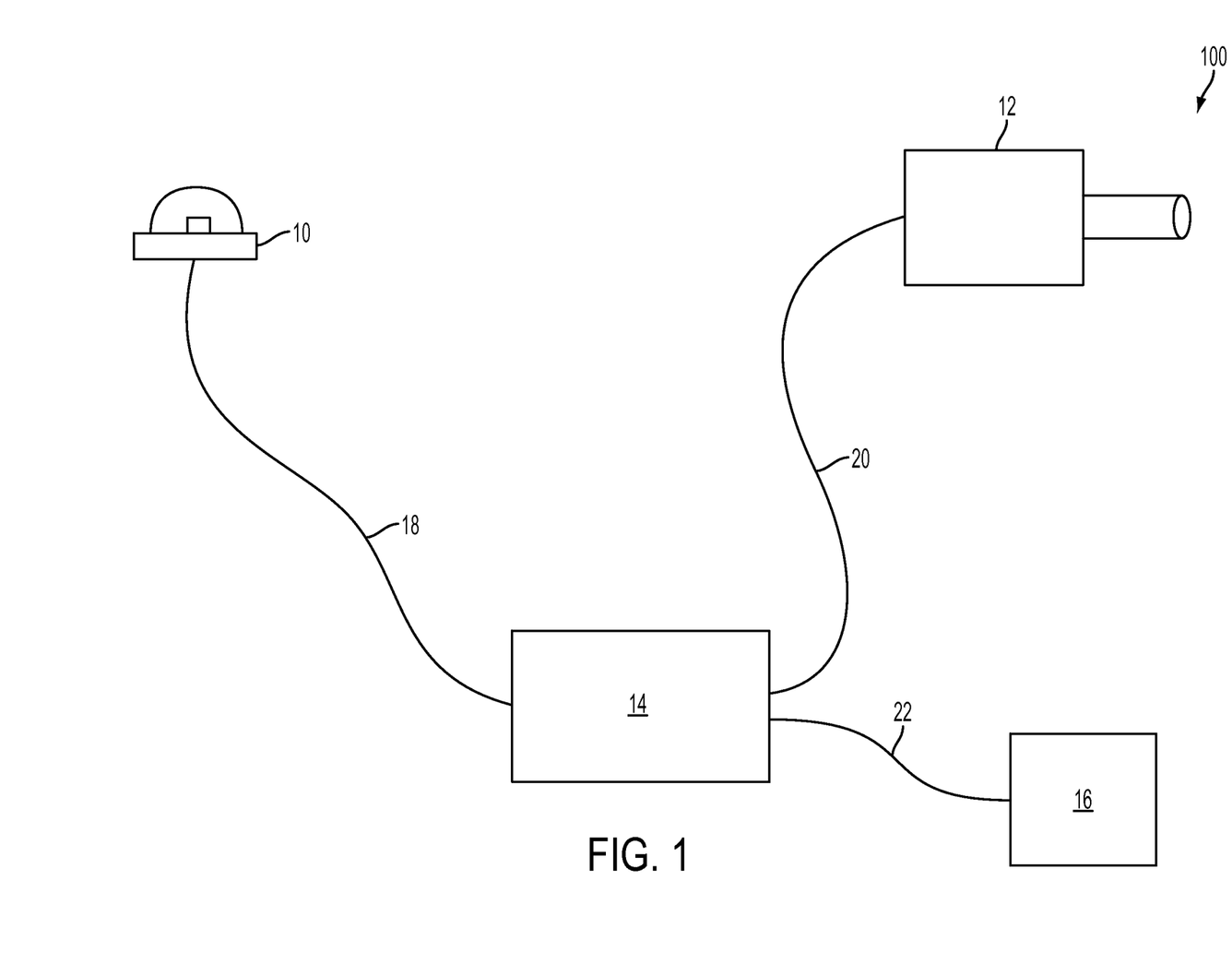
FIG. 1 is a block diagram of a dual-camera system.

FIG. 1 is a block diagram of a dual-camera system. In FIG. 1, a dual-camera system 100 includes an omnidirectional camera 10, a narrow-view camera 12, a video processor 14, and a display module 16. The omnidirectional camera 10 is coupled to the video processor 14 by way of a connection 18. In a typical embodiment, the omnidirectional camera 10 is a front-facing camera equipped with a fish-eye lens and has a field of view of at least 90 degrees. However, the omnidirectional camera 10 can be any type of omnidirectional camera such as, for example, a conical mirror camera, and typically has a field of view of at least 180 degrees. Although the dual-camera system 100 is depicted by way of example as including a single omnidirectional camera 10, a dual-camera system in accordance with principles of the invention can incorporate any number of omnidirectional cameras 10 arranged in any orientation such as, for example, a front-facing omnidirectional camera and a rear-facing omnidirectional camera. The narrow-view camera 12 is coupled to the video processor 14 by way of a connection 20.

In a typical embodiment, the narrow-view camera 12 has a field of view, for example, of approximately 10-50°; however, a camera that has any appropriate field of view may be used. Although the omnidirectional camera 10 and the narrow-view camera 12 are depicted by way of example as being connected to the video processor 14 via the connections 18 and 20, it is also contemplated that the omnidirectional camera 10 and the narrow-view camera 12 could be wirelessly connected to the video processor 14.

In a typical embodiment, the omnidirectional camera 10 and the narrow-view camera 12 are placed in close proximity to one another so that the points of view of the omnidirectional camera 10 and of the narrow-view camera 12 are at least approximately the same. The video processor 14 may be, for example, a stand-alone unit or contained within the same housing as one or both of the narrow-view camera 12 and the omnidirectional camera 10. The video processor 12 receives image data from both of the narrow-view camera 12 and the omnidirectional camera 10. The display module 16 is coupled to the video processor 14 by way of a connection 22. In a typical embodiment, the display module 16 includes a video display that simultaneously displays images captured by the omnidirectional camera 10 and the narrow-view camera 12 and processed by the video processor 14. Although the display module 16 is depicted by way of example as being connected to the video processor 14 via the connection 22, the display module 16 could be wirelessly connected to the video processor 14.

Figure 2A:
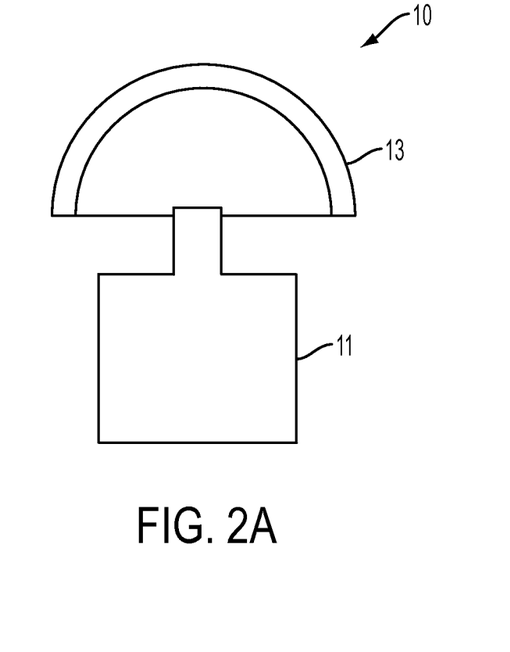
FIG. 2A is a side elevation view of an omnidirectional camera.

FIG. 2A is a side elevation view of a typical omnidirectional camera. In FIG. 2A, an omnidirectional camera 10 includes a sensor 11 and a lens 13. In a typical embodiment, the lens 13 is a fish-eye lens and has a field of view of approximately 180 degrees; however, lenses having different fields of view may be used. In addition, any lens adapted to focus omnidirectional images, such as, for example, a wide-angle lens, a super-wide-angle lens, a full-circle lens, a spherical mirror-type lens, a conical minor-type lens, or other lens or minor configuration capable of focusing omnidirectional images may be employed in place of the lens 13. In a typical embodiment, the omnidirectional camera 10 outputs image data to a display module or a video processor.

Figure 2B:
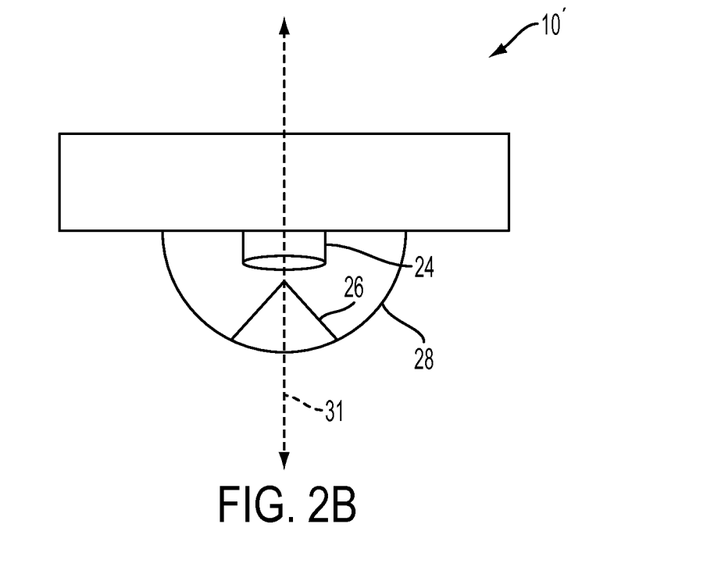
FIG. 2B is a side elevation view of another omnidirectional camera.

FIG. 2B is a side elevation view of another omnidirectional camera. In FIG. 2B, an omnidirectional camera 10' includes a sensor 24 arranged relative to an external mirror 26 and a dome 28, the dome 28 being concave relative to the sensor 24. The dome 28 and the minor 26 in combination are adapted to allow light to pass therethrough. In some embodiments, the dome 28 may be convex relative to the sensor 24, the dome 28 and mirror 26 in combination being adapted to reflect light towards the sensor 24. A resulting omnidirectional image captured by the omnidirectional camera 10' may be, for example, a 360-degree image of a scene surrounding the omnidirectional camera 10', wherein 360 degrees is relative to a centerline 31 of the camera 24. In some embodiments, the omnidirectional camera 10' may be a high-definition camera such as, for example, a camera having a sensor adapted to capture images on the order of several Megapixels. The omnidirectional camera 10' may be used interchangeably with the omnidirectional camera 10 in various embodiments. In a typical embodiment, the omnidirectional cameral 10' output image data to a display module or a video processor.

Figure 3:
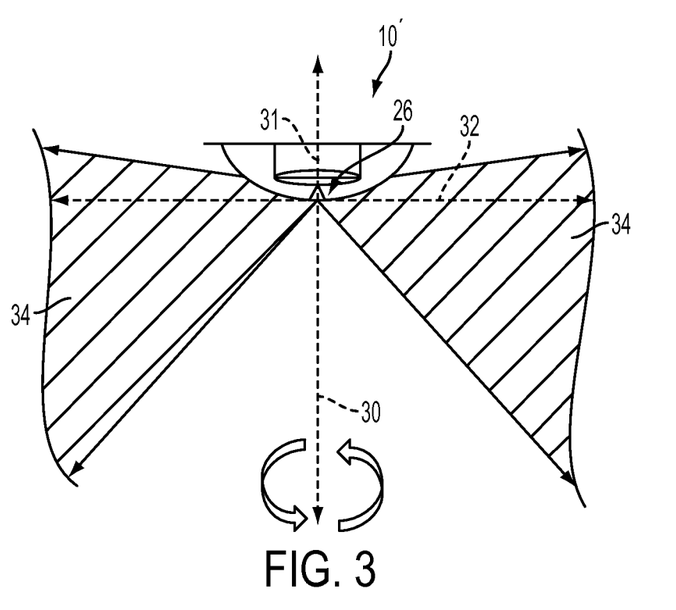
FIG. 3 is an illustrative field of view (FOV) of an omnidirectional camera.

FIG. 3 is an illustrative field of view (FOV) of the omnidirectional camera 10'. For descriptive purposes, a coordinate system has been superimposed about the omnidirectional camera 10'. The coordinate system has an optical axis 30 shown running vertically along the centerline 31 of the omnidirectional camera 10' and a horizontal axis 32 perpendicular thereto and passing through the minor 26.

In general, the FOV of a camera is the area of a scene around the camera that can be captured by the camera. The FOV 34 of the omnidirectional camera 10' along the horizontal axis 32 is shown. The FOV 34 extends both above and below the horizontal axis 32. For example, in the embodiment shown, the FOV 34 extends approximately 10 degrees above the horizontal axis 32 and approximately 45 degrees below the horizontal axis 32.

In various embodiments, the FOV 34 may extend more than or less than 10 degrees above the horizontal axis 32 and/or may extend more than or less than 45 degrees below the horizontal axis 32. Although FIG. 3 shows the FOV 34 along one axis, the full FOV of the omnidirectional camera 10' may include all 360 degrees of rotation about the optical axis 30. The entire panorama of the omnidirectional camera 10' would then be a 55°×360° FOV, where the 55 degrees represents the size of the angle relative to the horizontal axis 32. In typical embodiments, a FOV of the omnidirectional camera 10 and the FOV 34 of the omnidirectional camera 10' would be similar.

Figure 4A:
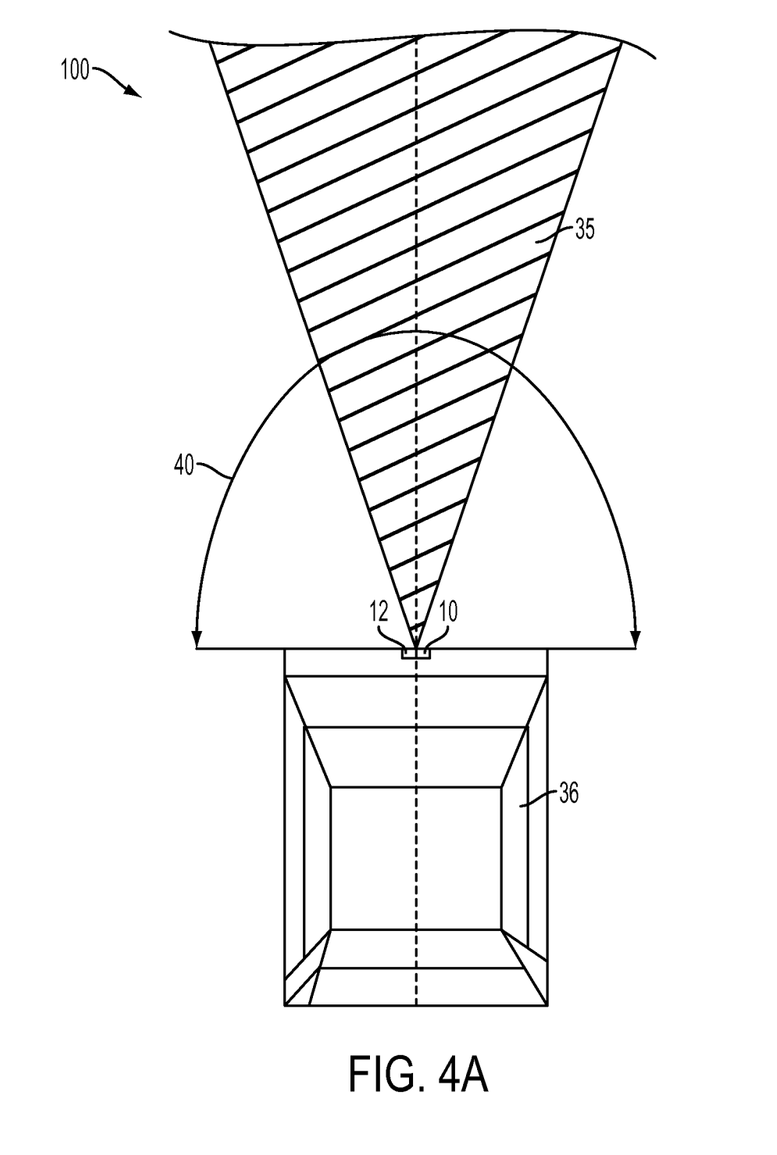
FIG. 4A is a top view of a dual-camera system.

FIG. 4A is a top view of the dual-camera system 100 in an illustrative environment. During operation, the omnidirectional camera 10 and the narrow-view camera 12 are positioned, for example, on a dashboard of a police vehicle 36. In a typical embodiment, the narrow-view camera 12 is oriented to capture images in front of the police vehicle 36 as shown by a field of view 35 and output image data representing the captured images. The omnidirectional camera 10 is oriented to have a similar point of view as that of the narrow-view camera 12. A field of view of the omnidirectional camera 10 is illustrated by arrows 40. The omnidirectional camera 10 captures images of objects in front of the police vehicle 36 as well as objects on the sides of the police vehicle 36 that are outside the field of view 35 of the narrow-view camera 12.

Figure 4B:
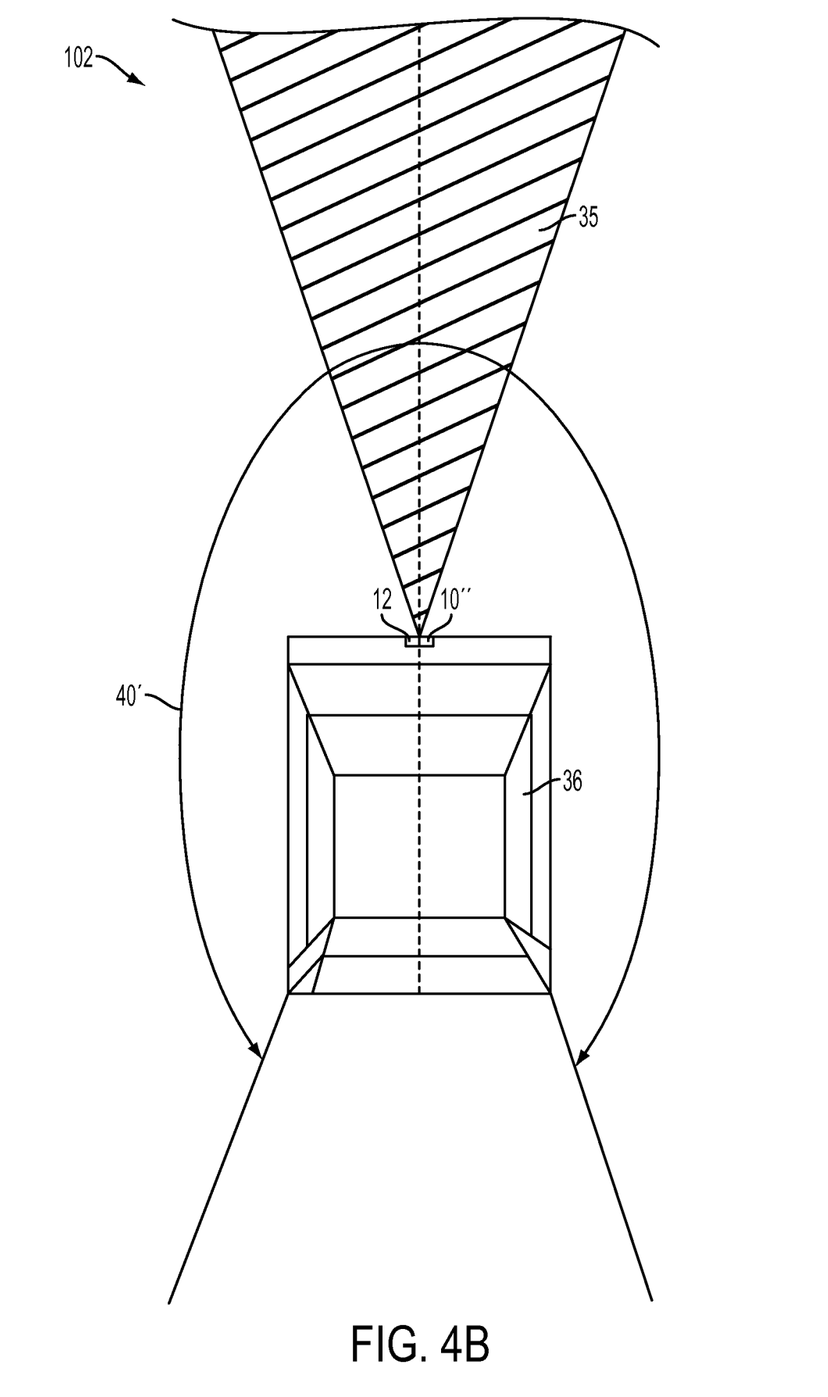
FIG. 4B is a top view of another dual-camera system.

FIG. 4B is a top view of another dual-camera system in an illustrative environment. In FIG. 4B, a system 102 includes an omnidirectional camera 10" that has a field of view that is greater than the 180 degrees illustrated in the system 100 of FIG. 4A. The field of view of the omnidirectional camera 10" is illustrated by arrows 40'. Similarly to the system 100, the narrow-view camera 12 and the omnidirectional camera 10" are placed in close proximity to each other such as, for example, on the dashboard of the police vehicle 36. In a typical embodiment, the narrow-view camera 12 is oriented to capture images in front of the police vehicle as shown by the field of view 35 and output image data representing the captured images.

Figure 4C:
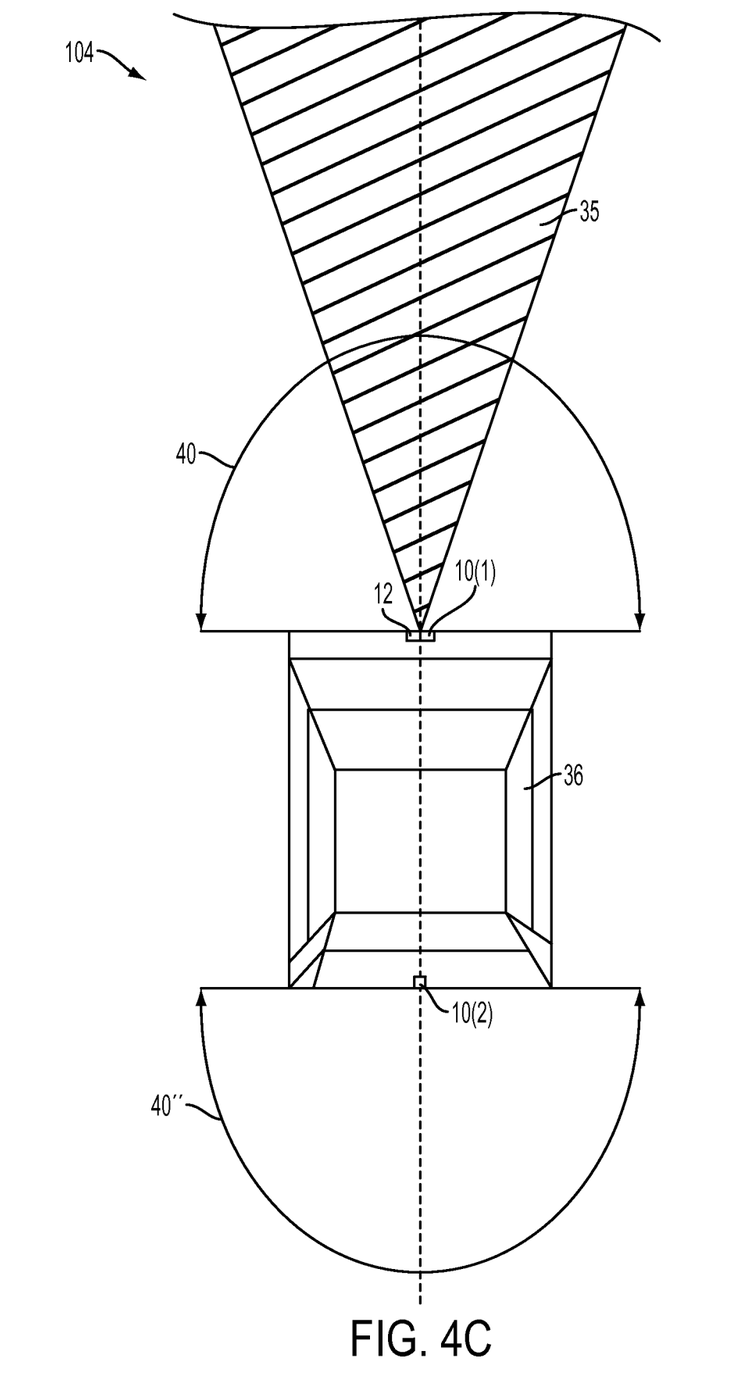
FIG. 4C is a top view of another dual-camera system.

FIG. 4C is a top view of another dual-camera system in an illustrative environment. In FIG. 4C, a system 104 includes omnidirectional cameras 10(1) and 10(2). Those having skill in the art will recognize that the number of omnidirectional or narrow-view cameras in a given system need not be limited to any particular number and that a plurality of either type of camera as dictated by design considerations may be used. The omnidirectional camera 10(1) is shown arranged in a front-facing orientation while the omnidirectional camera 10(2) is shown arranged in a rear-facing orientation relative to the police vehicle 36.

A field of view of the front-facing omnidirectional camera 10(1) is shown by the arrows 40. A field of view of the rear-facing omnidirectional camera 10(2) is shown by arrows 40". The inclusion of the rear-facing omnidirectional camera 10(2) allows the system 104 to obtain a full 360 degrees of coverage. In similar fashion to the system 100, the narrow-view camera 12 and the omnidirectional camera 10(1) are placed in close proximity to each other such as, for example, on the dashboard of the police vehicle 36. In a typical embodiment, the narrow-view camera 12 is oriented to capture images occurring directly in front of the police vehicle as shown by the field of view 35 and output image data representing the captured images. In some embodiments, a second narrow-view camera that is rear-facing may also be employed. Output of cameras facing different directions such as, for example the omnidirectional cameras 10(1) and 10(2), can be displayed simultaneously or sequentially in an automated fashion or responsive to user input.

Figure 5A:
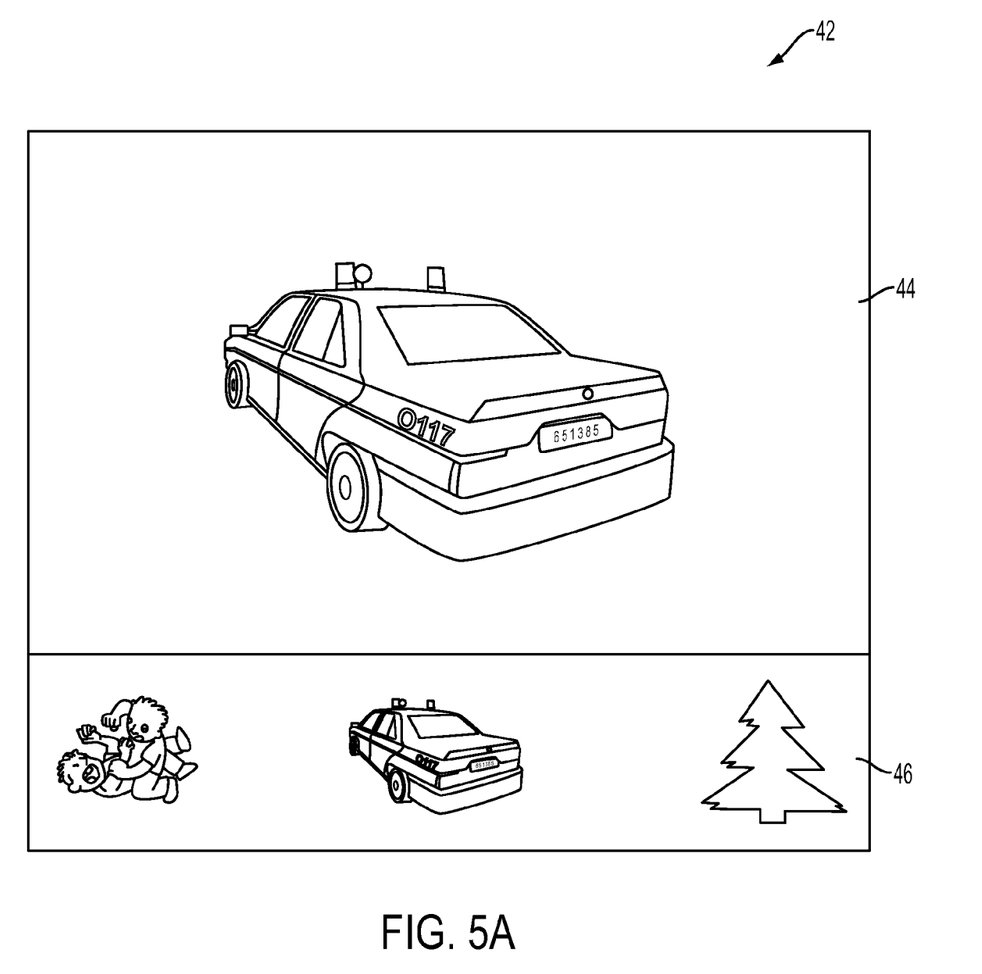
FIG. 5A is a detailed view of a combined image.

FIG. 5A is a detailed view of a combined image displayable via the display module 16. In FIG. 5A, a combined image 42 includes a narrow-view portion 44 and an omnidirectional portion 46. In a typical embodiment, the narrow-view portion 44 includes, for example, about 85% of the total viewable area of the combined image 42. The narrow-view portion 44 typically has a standard resolution of D1. The term D1 is commonly understood to represent a resolution of approximately 720×480. However, the narrow-view portion 44 may have a high-definition resolution such as, for example, 720p or 1080i. The narrow-view portion 44 typically includes at least part of an image captured by the narrow-view camera 12. The omnidirectional portion 46 includes, for example, a lower 15% of the area of the combined image 42; however, the size and positioning of the omnidirectional portion 46 may be altered as needed for particular applications. The omnidirectional portion 46 typically includes at least part of an image captured by an omnidirectional camera such as, for example, the omnidirectional camera 10.

Figure 5B:
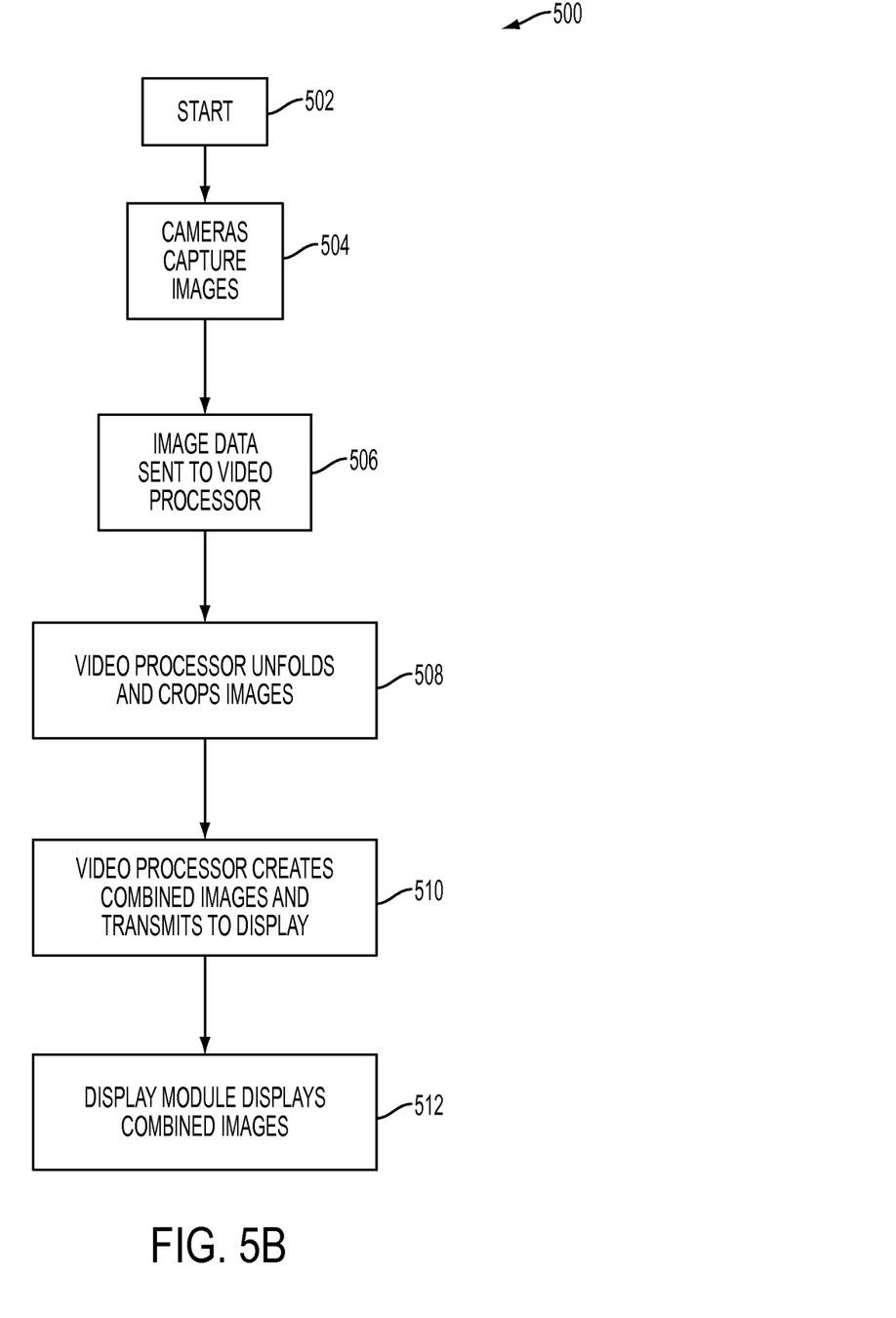
FIG. 5B is a flow diagram illustrating a process for operation of the camera system of FIG. 1.

FIG. 5B is a flow diagram illustrating a process for operation of the camera system of FIG. 1. Referring now to FIGS. 1, 5A, and 5B, a process 500 begins at step 502. At step 504, the omnidirectional camera 10 and the narrow-view camera 12 each capture images and create image data representing the captured images. At step 506, the image data are transmitted to the video processor 14.

At step 508, the video processor 14 digitally unfolds and crops the image data received by the video processor 14 from the omnidirectional camera 10. Unfolding may be performed in an effort to minimize edge distortion caused by the use of, for example, a fish-eye lens. Cropping may be performed to remove undesired or unimportant image portions. In another option, analog unfolding may be accomplished through use of a special lens designed to correct edge distortion. In order to minimize unacceptable image resolution post-unfolding, the omnidirectional camera 10 may capture images at a greater resolution than that of images captured by the narrow-view camera 12. In some embodiments, one or both of unfolding and cropping of the output by the omnidirectional camera 10 may not be performed.

In a typical embodiment, step 508 also includes cropping by the video processor of image data from the narrow-view camera 12 that contain irrelevant or unimportant information such as, for example, data representing a hood of a police vehicle. Cropping of the image data from the narrow-view camera 12 is performed so that irrelevant image portions are not displayed. In other words, a portion of a captured image that would otherwise be displayed and that often contains irrelevant image portions may be discarded and not displayed without loss of useful information.

At step 510, the video processor creates combined images 42 and transmits data representing the combined images 42 to the display module 16. The combined images 42 are composed of narrow-view portions 44 and omnidirectional portions 44. At step 512, the display module displays the combined images 42. The omnidirectional portions 46 can be thought of as being displayed in place of a portion of images output from the narrow-view camera 12 that are considered unimportant. In some embodiments, data representing the narrow-view portion 44 and the omnidirectional portion 46 are transmitted from the video processor 14 to the display module 16 as separate data streams and are displayed by the display module 16 as separate images to form the combined image 42, while in other embodiments, a single combined-image data stream is employed.

Figure 6A:
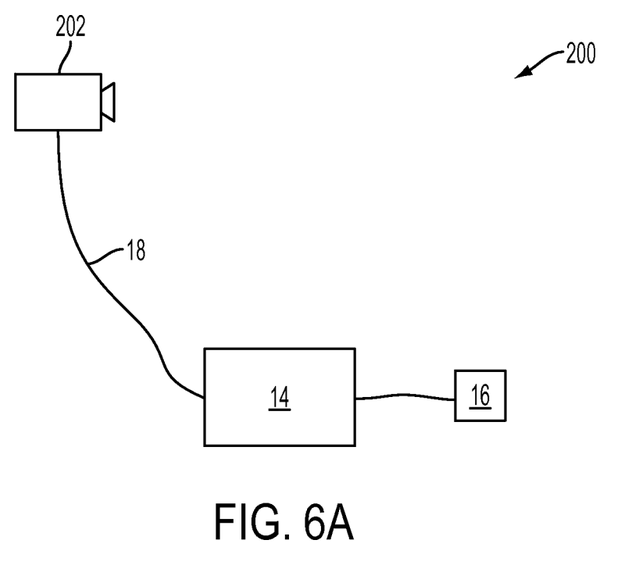
FIG. 6A is a block diagram of a single-camera system.

FIG. 6A is a block diagram of a single-camera system. In FIG. 6A, a single-camera system 200 includes the video processor 14, the display module 16, and a sensor 202. The display module 16 is coupled to the video processor 14 by way of the connection 22. The sensor 202 is coupled to the video processor 14 by way of the connection 18. The sensor 202 may be any appropriate video sensor but is typically a 20-40 megapixel sensor. In a typical embodiment, the sensor 202 has a field of view of approximately 180 degrees; however, fields of view up to and including 360 degrees may also be utilized.

Figure 6B:
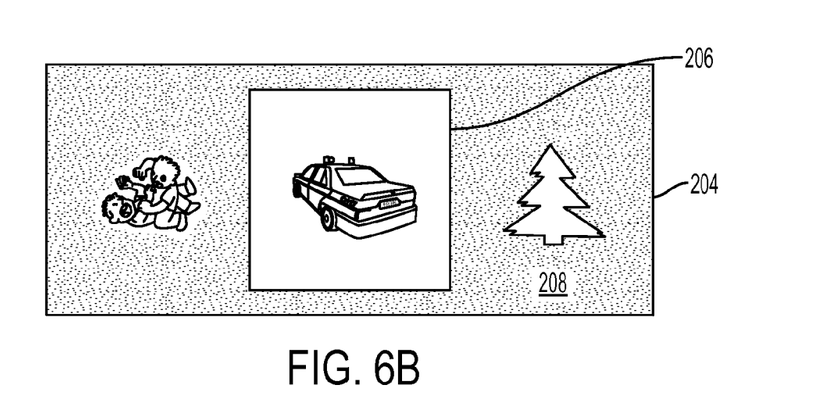
FIG. 6B is a detailed view of an image captured by the camera system of FIG. 6A.

FIG. 6B is a detailed view of an image captured by a sensor such as the sensor 202. In FIG. 6B, an omnidirectional image 204 captured by the sensor 202 includes a relevant area 206 as well as portions of the omnidirectional image 204 that are not within the relevant area 206 as illustrated by a shaded area 208. In some embodiments, the shaded area 208 includes all or part of the relevant area 206. In a typical embodiment, the relevant area 206 may be, for example, the area directly in front of a police vehicle or areas including license plates.

Figure 6C:
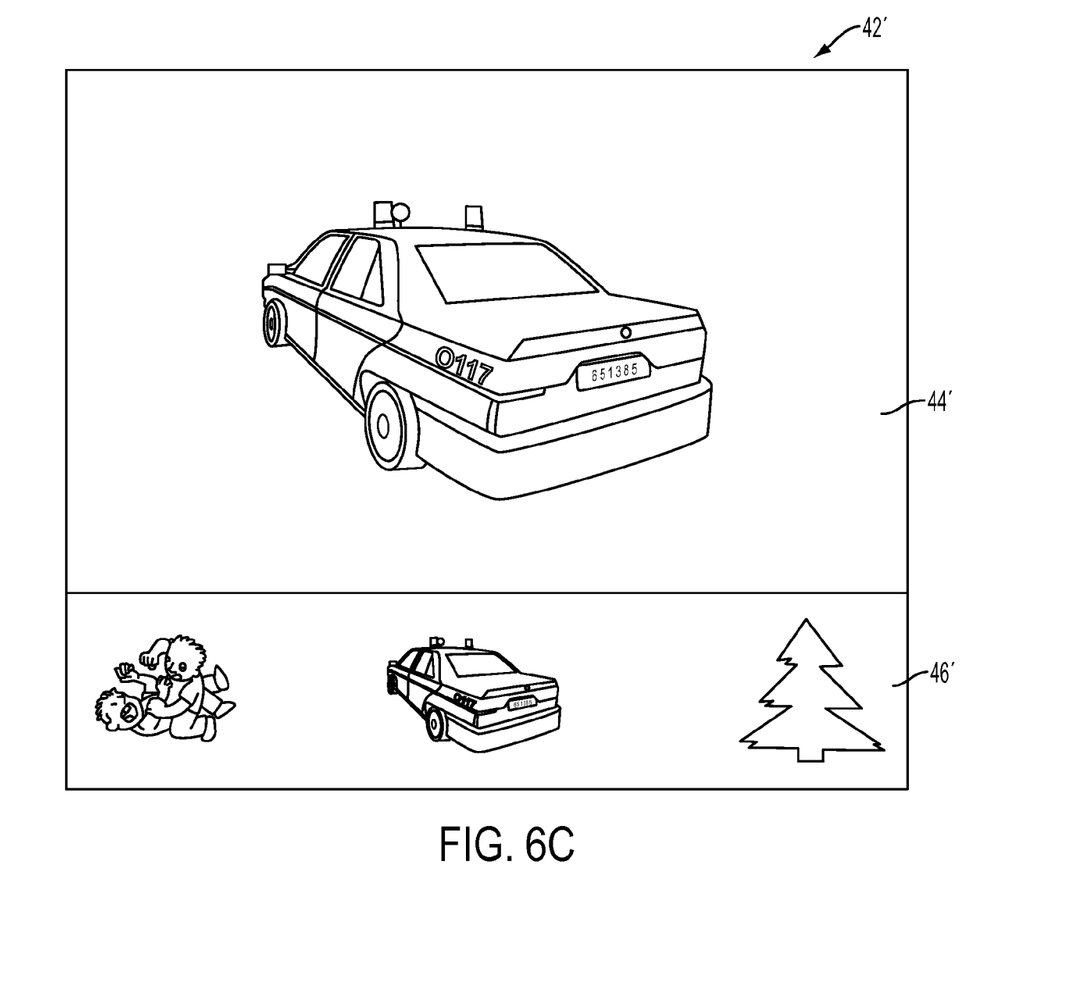
FIG. 6C is a detailed view of a modified image displayed by display module of the camera system shown in FIG. 6A.

FIG. 6C is a detailed view of a modified image displayed by the display module 16 of the camera system 200. In FIG. 6C, a modified image 42' includes a narrow-view portion 44' and an omnidirectional portion 46'. The narrow-view portion of 44' is an enlarged version of the relevant area 206 and the omnidirectional portion 46' is a cropped version of the shaded area 208. In some embodiments, the cropped omnidirectional portion 46' is also downsampled.

Referring now to FIGS. 6A-6C, during operation, the sensor 202 captures the omnidirectional image 204 at very high resolution such as, for example, 20-40 megapixels. Data representing the omnidirectional image 204 is transmitted from the sensor 202 to the video processor 14 via the connection 18. The video processor 14 identifies and enlarges the relevant area 206, the enlargement thereof resulting in the narrow-view portion 44'. The video processor 14 also crops the shaded area 208, thereby forming a cropped version thereof (i.e., the omnidirectional portion 46'). As noted above, in some embodiments, the shaded area 208 includes all or part of the relevant area 206. The display module 16 displays the narrow-view portion 44' and the cropped version of the shaded area 208 (i.e., the omnidirectional portion 46'). In this sense, the system 200 creates data representing the narrow-view portion 44' via what is sometimes referred to as digital zoom.

The video processor 14 also typically downsamples at least portions of data representing the omnidirectional image 204 not within the relevant area 206 (e.g., the shaded area 208). In other embodiments, both data representing the relevant area 206 and the shaded area 208 are downsampled. Downsampling reduces the amount of data needed to be displayed and, in some cases, transferred between components of the system 200. The shaded area 208 need not necessarily include all of the omnidirectional image 204 other than the relevant area 206. Regardless of whether only the shaded area 208 or both the shaded area 208 and the relevant area 206 are downsampled, one or both of the relevant area 206 and the enlarged version of the relevant area 206 may be retained so as to be available to be presented to and displayed by the display module 16. In another option, downsampling may be performed by the sensor 202, thereby reducing the amount of data that must be transmitted from the sensor 202 to the video processor 14.

The video processor 14 typically transmits data representing the combined image 42' to the display module 16 as a single data stream. As illustrated, the combined image 42' includes the narrow-view portion 44' and the omnidirectional portion 46'. The display module 16 displays at least part of the omnidirectional image 204 or a downsampled version thereof in the omnidirectional portion 46' of the display module 16. In similar fashion, the display module 16 displays the relevant area 206 or an enlarged version thereof in the narrow-view portion 44'. In this way, more-relevant images are in some embodiments presented at a relatively higher resolution, while less relevant images are presented at a relatively lower resolution.

In other embodiments, the combined image 42' is created by the display module 16 from a first video stream containing, for example, the enlarged version of the relevant area 206 and a second video stream containing, for example, all or part of a downsampled version of the omnidirectional image 204. In such embodiments, the video processor 14 presents a first video stream to the display module 16 containing the enlarged version of the relevant area 206. The video processor 14 also presents a second video stream containing all or part of the downsampled version of the omnidirectional portion 204.

Figure 7:
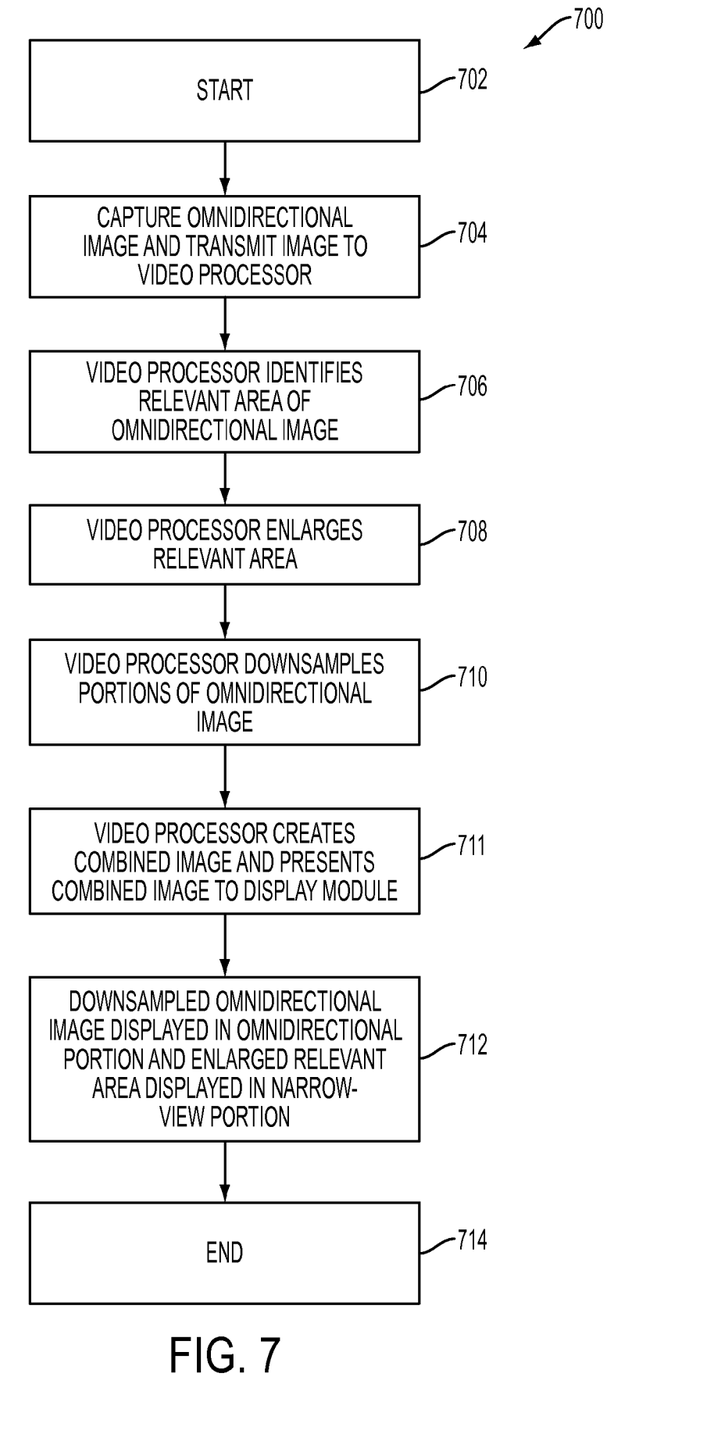
FIG. 7 is a flow diagram illustrating a process for operation of the camera system of FIG. 6A.

FIG. 7 is a flow diagram illustrating a process of operation of the camera system 200. In FIG. 7, a process 700 starts at step 702. From step 702, execution proceeds to step 704. At step 704, the sensor 202 captures an omnidirectional image and transmits the data representing the captured omnidirectional image to the video processor 14. From step 704, execution proceeds to step 706. At step 706, the video processor 14 identifies the relevant area 206. From step 706, execution proceeds to step 708. At step 708, the video processor 14 enlarges the relevant area 206 to create an enlarged version thereof; however, in some embodiments, step 708 may not be performed such that the relevant area 206 is not enlarged. From step 708, execution proceeds to step 710.

At step 710, the video processor 14 optionally downsamples at least portions of the omnidirectional image 204, such as those within the shaded area 208. At step 711, the video processor creates a combined image 42' that includes the enlarged version of the relevant area 206 and at least part of the downsampled portions of the omnidirectional image 204 and presents the combined image 42' to the display module 16. In another option, the combined image 42' may be created by the display module 16 from a first video stream containing the enlarged version of the relevant area 206 and a second video stream containing at least part of the downsampled portions of the omnidirectional image 204.

At step 712, the display module 16 displays the combined image 42'. In other words, the display module 16 displays the enlarged version of the relevant area 206 in the narrow-view portion 44' and at least part of the downsampled portions of the omnidirectional image 204 in the omnidirectional portion 46'. The process ends at step 714. Various steps of the process 700 may be performed concurrently or in a different order than described above without departing from principles of the invention.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein. For example, although the omnidirectional camera 10 and the narrow-view camera 12 are described herein as separate units, a system could contain both the omnidirectional camera 10 and the narrow-view camera 12 in a single housing. Furthermore, components may have different functions from those described herein. In particular, functions described herein as being performed by the video processor 14 may, in various embodiments, be performed by one or both of the omnidirectional camera 10 or the narrow-view camera 12. The system 100 and the system 200 and the displayed images 42 and 42' are only examples of split-screen displayed images that could be created by various embodiments. It is intended that the specification and examples be considered as illustrative only. For example, either of the system 100 or the system 200 could be used to display either or both of the combined image 42 or the combined image 42' or other configurations of combined images in accordance with principles of the invention. In addition, regardless of whether operations performed by the video processor 14 are described as being performed on images or image data, it will be understood that the operations are digital operations performed on image data.

What is claimed is:

1. A system comprising:
a first camera operable to capture omnidirectional images and send an omnidirectional-image data stream representing the omnidirectional images;
a second camera operable to capture narrow-view images and send a narrow-view-image data stream representing the narrow-view images;
a video processor coupled to the first camera and the second camera and operable to:
as the omnidirectional-image data stream and the narrow-view-image data stream are received, identify a relevant image portion of at least one of the omnidirectional-image data stream and the narrow-view-image data stream;
remove, from the at least one of the omnidirectional-image data stream and the narrow-view-image data stream, image data that is not contained within the relevant image portion;
form a combined-image data stream using at least part of the omnidirectional-image data and the narrow-view-image data; and
wherein the combined-image data stream replaces the removed image data with other image data selected from one or more of the omnidirectional-image data stream and the narrow-view-image data stream;
a display module interoperably coupled to the video processor and operable to display combined images from the combined-image data stream; and
wherein the combined images each comprise a narrow-view-display portion and an omnidirectional-display portion.

2. The system of claim 1, wherein the removed image data comprises image data selected from the omnidirectional-image data.

3. The system of claim 1, wherein the removed image data comprises image data selected from the narrow-view-image data.

4. The system of claim 1, wherein the omnidirectional-display portion is displayed in place of a portion of the narrow-view images.

5. The system of claim 1, wherein the narrow-view images are captured at a greater resolution than the omnidirectional images.

6. A method comprising:
concurrently capturing omnidirectional images and narrow-view images;
storing data representing the captured omnidirectional images as omnidirectional-image data;
storing data representing the captured narrow-view images as narrow-view-image data;
identifying, by a video processor, a relevant image portion in the narrow-view-image data;
the video processor removing, from the narrow-view-image data, image data that is not contained within the relevant image portion, the removing yielding cropped narrow-view-image data;
creating, by the video processor, combined-image data using the cropped narrow-view-image data and at least part of the omnidirectional-image data;
wherein the combined-image data replaces the removed image data with image data selected from the omnidirectional-image data; and
displaying combined images from the combined-image data.

7. The method of claim 6, wherein the omnidirectional images are captured at a greater resolution than the narrow-view images.

8. The method of claim 6, wherein:
the removed image data comprises image data selected from the narrow-view-image data; and
at least a portion of the omnidirectional images are displayed in place of the removed image data.

9. The method of claim 6, wherein the removed image data comprises image data selected from the omnidirectional-image data.

10. The method of claim 9, wherein:
the removing comprises cropping the omnidirectional-image data; and
the creating step uses the cropped omnidirectional-image data.

11. The method of claim 6, wherein the storing steps are performed concurrently.

12. A system comprising:
an omnidirectional sensor operable to capture images and create therefrom image data;
a video processor operable to:
create, from at least part of the image data, combined-image data comprising narrow-view-image data and non-narrow-view-image data; and
wherein the creation comprises:
identification of one or more relevant image portions in the image data;
for at least one relevant image portion of the one or more relevant image portions, removal, from the image data, of at least selected data that is not contained within the at least one relevant image portion;
wherein the combined-image data replaces the at least selected image data with other image data selected from at least one of the narrow-view-image data and the non-narrow-view-image data;
a display module interoperably coupled to the video processor and operable, using the combined-image data, to display combined images comprising narrow-view images and non-narrow-view images; and
wherein the displayed narrow-view images comprise an enlarged version of a portion of images represented by the image data.

13. The system of claim 12, wherein the narrow-view images are displayed in place of the removed at least selected data.

14. The system of claim 12, wherein the video processor downsamples the non-narrow-view-image data.

15. The system of claim 12, wherein, as part of the creation of the combined-image data, the video processor:
wherein the identification comprises identification of the at least one relevant image portions in the non-narrow-view-image data; and
wherein the removal comprises deletion of the at least selected data from the non-narrow-view-image data.

16. The system of claim 12, wherein, as part of the creation of the combined-image data, the video processor:
wherein the identification comprises identification of the at least one relevant image portions in the narrow-view-image data; and
wherein the removal comprises deletion of the at least selected data from the narrow-view-image data.

17. A method comprising:
capturing omnidirectional images;
identifying one or more relevant areas of the omnidirectional images via a video processor;

enlarging at least one relevant area of the one or more relevant areas via the video processor, the enlarging resulting in enlarged relevant-area images;

downsampling and cropping the omnidirectional images via the video processor, the downsampling resulting in downsampled cropped omnidirectional images;

wherein the cropping comprises removing, from the omnidirectional images, at least selected image data that is not contained within the one or more relevant areas;

combining the enlarged relevant-area images and the downsampled cropped omnidirectional images into combined images via the video processor; and displaying the combined images via a display module.

18. The method of claim 17, wherein the displaying comprises displaying the enlarged relevant-area images at a higher resolution than the downsampled cropped omnidirectional images.

19. The method of claim 17, comprising digitally unfolding the omnidirectional images via the video processor.

* * * * *

UNITED STATES PATENT AND TRADEMARK OFFICE
CERTIFICATE OF CORRECTION

PATENT NO.        : 8,736,680 B1
APPLICATION NO.   : 13/109557
DATED             : May 27, 2014
INVENTOR(S)       : Andrew Cilia et al.

Page 1 of 1

It is certified that error appears in the above-identified patent and that said Letters Patent is hereby corrected as shown below:

In the Specification

Column 4, Line 13    Replace "minor-type lens," with -- mirror-type lens, --

Column 4, Line 14    Replace "minor configuration" with -- mirror configuration --

Column 4, Line 22    Replace "minor 26" with -- mirror 26 --

Column 4, Line 44    Replace "minor 26." with -- mirror 26. --

Signed and Sealed this
Twenty-sixth Day of August, 2014

Michelle K. Lee
*Deputy Director of the United States Patent and Trademark Office*